US008715882B2

(12) United States Patent
Sopchak et al.

(10) Patent No.: US 8,715,882 B2
(45) Date of Patent: May 6, 2014

(54) HIGH POWER DENSITY FUEL CELL COMPRISING AN ARRAY OF MICROCHANNELS

(75) Inventors: David A. Sopchak, Oakland, CA (US); Jeffrey D. Morse, Westhampton, MA (US); Ravindra S. Upadhye, Pleasanton, CA (US); Jack Kotovsky, Alameda, CA (US); Robert T. Graff, Modesto, CA (US)

(73) Assignee: Lawrene Livermore National Security, LLC., Livermore, CA (US)

( * ) Notice: Subject to any disclaimer, the term of this patent is extended or adjusted under 35 U.S.C. 154(b) by 693 days.

(21) Appl. No.: 12/829,331

(22) Filed: Jul. 1, 2010

(65) Prior Publication Data

US 2010/0323278 A1    Dec. 23, 2010

Related U.S. Application Data

(63) Continuation-in-part of application No. 11/119,525, filed on Apr. 28, 2005, now Pat. No. 7,776,479.

(60) Provisional application No. 60/566,759, filed on Apr. 29, 2004, provisional application No. 61/236,943, filed on Aug. 26, 2009.

(51) Int. Cl.
*H01M 8/04* (2006.01)
*H01M 8/08* (2006.01)

(52) U.S. Cl.
USPC ........... 429/500; 429/513; 429/455; 429/447; 429/433

(58) Field of Classification Search
USPC ......... 429/437, 434, 451, 528, 465, 456, 513, 429/433, 455, 447, 500
See application file for complete search history.

(56) References Cited

U.S. PATENT DOCUMENTS

| | | | |
|---|---|---|---|
| 4,463,067 A * | 7/1984 | Feigenbaum | 429/451 |
| 5,525,436 A | 6/1996 | Savinell et al. | 429/30 |
| 6,703,152 B2 | 3/2004 | Komiya et al. | 429/24 |
| 6,833,204 B2 | 12/2004 | Oyanagi et al. | 429/13 |
| 6,960,235 B2 | 11/2005 | Morse et al. | 48/127.9 |
| 7,029,781 B2 | 4/2006 | Lo Priore et al. | 429/32 |
| 2001/0049042 A1 * | 12/2001 | Okamoto et al. | 429/26 |
| 2002/0012822 A1 | 1/2002 | Oyanagi et al. | 429/13 |
| 2002/0012823 A1 | 1/2002 | Komiya et al. | 429/13 |
| 2002/0177032 A1 * | 11/2002 | Suenaga et al. | 429/44 |

(Continued)

OTHER PUBLICATIONS

"Miniaturized Proton Exchange Fuel Cell in micromachined Silicon surface", D'Arrigo et al., Proc. SPIE, vol. 5344, Jan. 24, 2004.*
"Development of portable fuel cell arrays with printed-circuit technology", O'Hayre et al., Journal of Power Sources, 124, 2003, p. 459-472.*

(Continued)

*Primary Examiner* — Kenneth Douyette
(74) *Attorney, Agent, or Firm* — Dominic M. Kotab

(57) ABSTRACT

A phosphoric acid fuel cell according to one embodiment includes an array of microchannels defined by a porous electrolyte support structure extending between bottom and upper support layers, the microchannels including fuel and oxidant microchannels; fuel electrodes formed along some of the microchannels; and air electrodes formed along other of the microchannels. A method of making a phosphoric acid fuel cell according to one embodiment includes etching an array of microchannels in a substrate, thereby forming walls between the microchannels; processing the walls to make the walls porous, thereby forming a porous electrolyte support structure; forming anode electrodes along some of the walls; forming cathode electrodes along other of the walls; and filling the porous electrolyte support structure with a phosphoric acid electrolyte. Additional embodiments are also disclosed.

39 Claims, 9 Drawing Sheets

(56) References Cited

U.S. PATENT DOCUMENTS

| | | | |
|---|---|---|---|
| 2003/0039874 A1* | 2/2003 | Jankowski et al. | 429/26 |
| 2004/0009377 A1 | 1/2004 | Iguchi et al. | 429/13 |
| 2004/0023101 A1 | 2/2004 | Jacobson et al. | |
| 2004/0072039 A1 | 4/2004 | Jankowski et al. | 429/19 |
| 2004/0142214 A1 | 7/2004 | Priore et al. | |
| 2005/0260485 A1 | 11/2005 | Sopchak et al. | 429/46 |
| 2006/0251969 A1 | 11/2006 | Maier et al. | |

OTHER PUBLICATIONS

U.S. Appl. No. 12/829,316, filed Jul. 1, 2010.
Restriction/Election Requirement from U.S. Appl. No. 12/829,316 dated Jul. 30, 2012.
Non-Final Office Action from U.S. Appl. No. 12/829,316 dated Sep. 20, 2012.

* cited by examiner

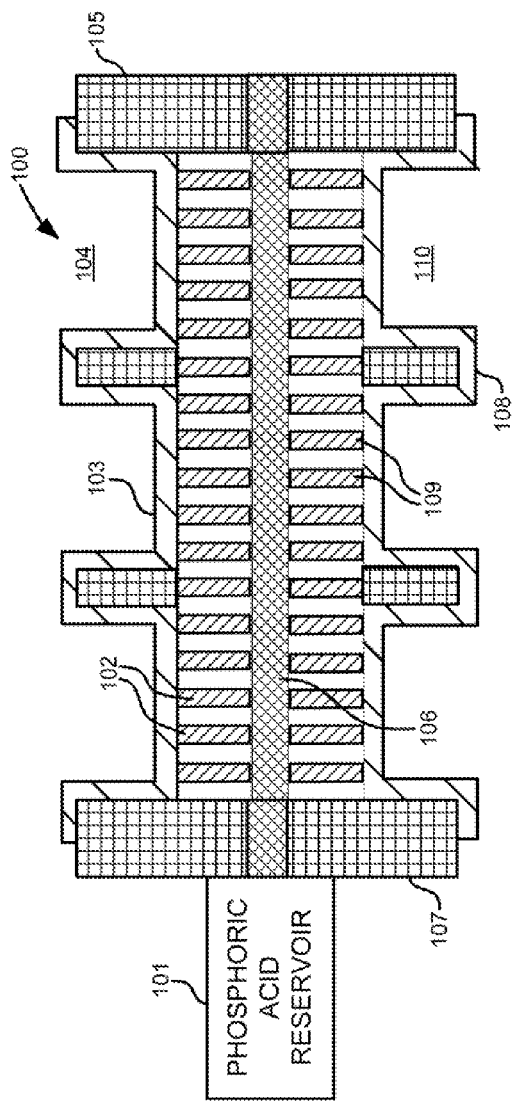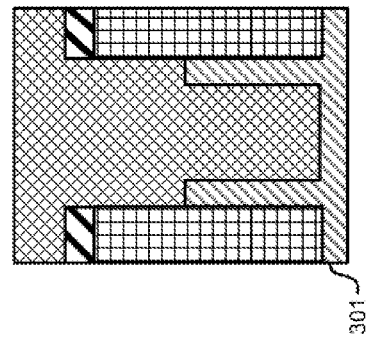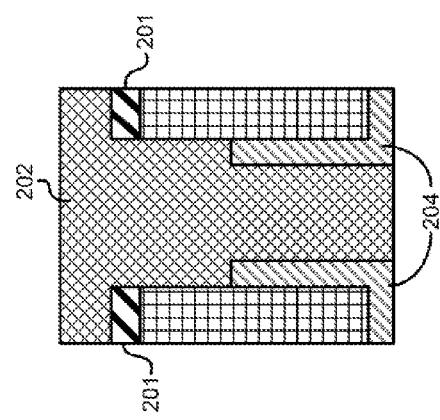

HIGH POWER DENSITY FUEL CELL COMPRISING AN ARRAY OF MICROCHANNELS

RELATED APPLICATIONS

This application is a continuation in part of U.S. patent application Ser. No. 11/119,525, filed Apr. 28, 2005, now U.S. Pat. No. 7,776,479; claims priority to provisional U.S. Patent Application No. 60/566,759 filed on Apr. 29, 2004; and claims priority to provisional U.S. Patent Application No. 61/236,943 filed on Aug. 26, 2009, all of which are herein incorporated by reference.

This application is related to U.S. patent application Ser. No. 12/829,316 to Morse et al., filed concurrently herewith and having title "High Power Density Fuel Cell and Methods Thereof," which is incorporated by reference.

The United States Government has rights in this invention pursuant to Contract No. W-7405-ENG-48 between the United States Department of Energy and the University of California for the operation of Lawrence Livermore National Laboratory.

FIELD OF THE INVENTION

The present invention relates to fuel cells, and particularly, to high density fuel cells.

BACKGROUND

There are several types of fuel cells currently available, all with specific advantages and disadvantages. Currently, work has been intensifying in the area of methanol reformers, devices that can convert methanol and water into hydrogen and carbon dioxide. The hydrogen from such a device can be used to run a fuel cell. Typically, these reformers operate at 200-300° C., and produce several tenths of a percent carbon monoxide in their effluent stream. Proton exchange membrane (PEM) fuel cells typically operate at <85° C. At these temperatures, more than 100 ppm carbon monoxide in the fuel stream is typically poisonous to the anode catalyst of a fuel cell. In order to alleviate this condition, a preferential oxidizer, or PROX, is used to selectively oxidize carbon monoxide in the fuel stream to carbon dioxide, while leaving most of the hydrogen unreacted, before it reaches the fuel cell. The preferential oxidizer lowers the carbon monoxide levels to less than 100 ppm, yet this is still enough to poison the anode of the low temperature PEM fuel cell.

A fuel cell that operates at 80° C., while intrinsically a fairly efficient device, nonetheless liberates about 50% of the energy in the fuel stream as heat. At such temperatures, this waste heat is of low quality and cannot be used to drive the reforming reaction, which is endothermic. Typical proton exchange membranes, such as Nation, also require aggressive humidification for optimal ionic conductivity and peak performance. Supplying the fuel cell with both fuel and oxidant gas streams at near saturated levels increases system complexity. Also, a fuel cell is a device that creates water as product, while typically necessitating a tight operating window where conditions must be delicately balanced between saturation for optimum performance, while avoiding condensing conditions. which chokes off gas access to the electrodes and degrades performance.

Thus, a nominal fuel cell is preferably ideally suited, both thermally and chemically, for operation in conjunction with a methanol or other hydrocarbon fuel reformer. Phosphoric acid fuel cells (PAFCs) are well suited for these conditions, as they can operate at higher temperatures.

U.S. Pat. No. 6,833,204 to Hiroyuki Oyanagi et al, assigned to Honda Giken Kogyo Kabushiki Kasha, issued Dec. 21, 2004; as well as U.S. Pat. No. 6,703,152 and United States Patent Applications Pub. Nos. 2004/0009377, 2002/0012823, and 2002/0012822; provide the following state of technology information: "The phosphoric acid fuel cell has a power-generating cell which is provided with an electrolyte-electrode assembly comprising an anode electrode, a cathode electrode, and an electrolyte layer interposed between the both electrodes. The electrolyte layer is generally constructed such that pores of a porous silicon carbide member is impregnated with concentrated phosphoric acid (liquid electrolyte). However, another type of the electrolyte layer is also known, in which a membrane of basic polymer such as polybenzimidazole is impregnated with phosphoric acid or sulfuric acid (see U.S. Pat. No. 5,525,436). In the phosphoric acid fuel cell, a predetermined number of the power-generating cells are electrically connected in series with each other to provide a fuel cell stack which is accommodated in a container. When the phosphoric acid fuel cell is operated, at first, the hydrogen-containing gas is supplied to the anode electrode, and the oxygen-containing gas is supplied to the cathode electrode.

The hydrogen in the hydrogen-containing gas is ionized on the anode electrode in a manner as represented by the following reaction formula (A). As a result, the hydrogen ion and the electron are generated.

$$2H_2 \rightarrow 4H^+ + 4e \tag{A}$$

The hydrogen ion is moved toward the cathode electrode via the electrolyte layer. On the other hand, the electron is extracted by an external circuit which is electrically connected to the anode electrode and the cathode electrode. The electron is utilized as the DC electric energy to energize the external circuit, and then it arrives at the cathode electrode. The hydrogen ion moved to the cathode electrode and the electron arrived at the cathode electrode via the external circuit cause the reaction as represented by the following reaction formula (B) together with the oxygen in the oxygen-containing gas supplied to the cathode electrode.

$$O_2 + 4H^+ + 4e \rightarrow 2H_2O \tag{B}$$

The reaction according to the reaction formula (B) is slow as compared with the reaction formula (A). That is, the reaction represented by the reaction formula (B) constitutes the rate-determining step in the overall cell reaction of the phosphoric acid fuel cell."

SUMMARY

A phosphoric acid fuel cell according to one embodiment includes an array of microchannels defined by a porous electrolyte support structure extending between bottom and upper support layers, the microchannels including fuel and oxidant microchannels; fuel electrodes formed along some of the microchannels; and air electrodes formed along other of the microchannels.

A method of making a phosphoric acid fuel cell according to one embodiment includes etching an array of microchannels in a substrate, thereby forming walls between the microchannels; processing the walls to make the walls porous, thereby forming a porous electrolyte support structure; forming anode electrodes along some of the walls; forming cathode electrodes along other of the walls; and filling the porous electrolyte support structure with a phosphoric acid electrolyte.

A fuel cell according to yet another embodiment includes an array of microchannels defined by a porous electrolyte support structure extending between bottom and upper support layers, the microchannels including fuel and oxidant microchannels; fuel electrodes formed along some of the microchannels; and air electrodes formed along other of the microchannels.

A method of making a fuel cell according to another embodiment includes etching an array of microchannels in a substrate, thereby forming walls between the microchannels; processing the walls to make the walls porous, thereby forming a porous electrolyte support structure; forming anode electrodes along some of the walls; forming cathode electrodes along other of the walls; and filling the porous electrolyte support structure with a proton-conducting or ion-conducting electrolyte.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 illustrates one embodiment of a phosphoric acid fuel cell constructed in accordance with one embodiment of the present invention.

FIG. 2 shows an enlarged view of a section of the phosphoric acid fuel cell shown in FIG. 1.

FIG. 3 shows an alternative version of the enlarged view of a section of the phosphoric acid fuel cell shown in FIG. 1.

DETAILED DESCRIPTION

Figure 4:
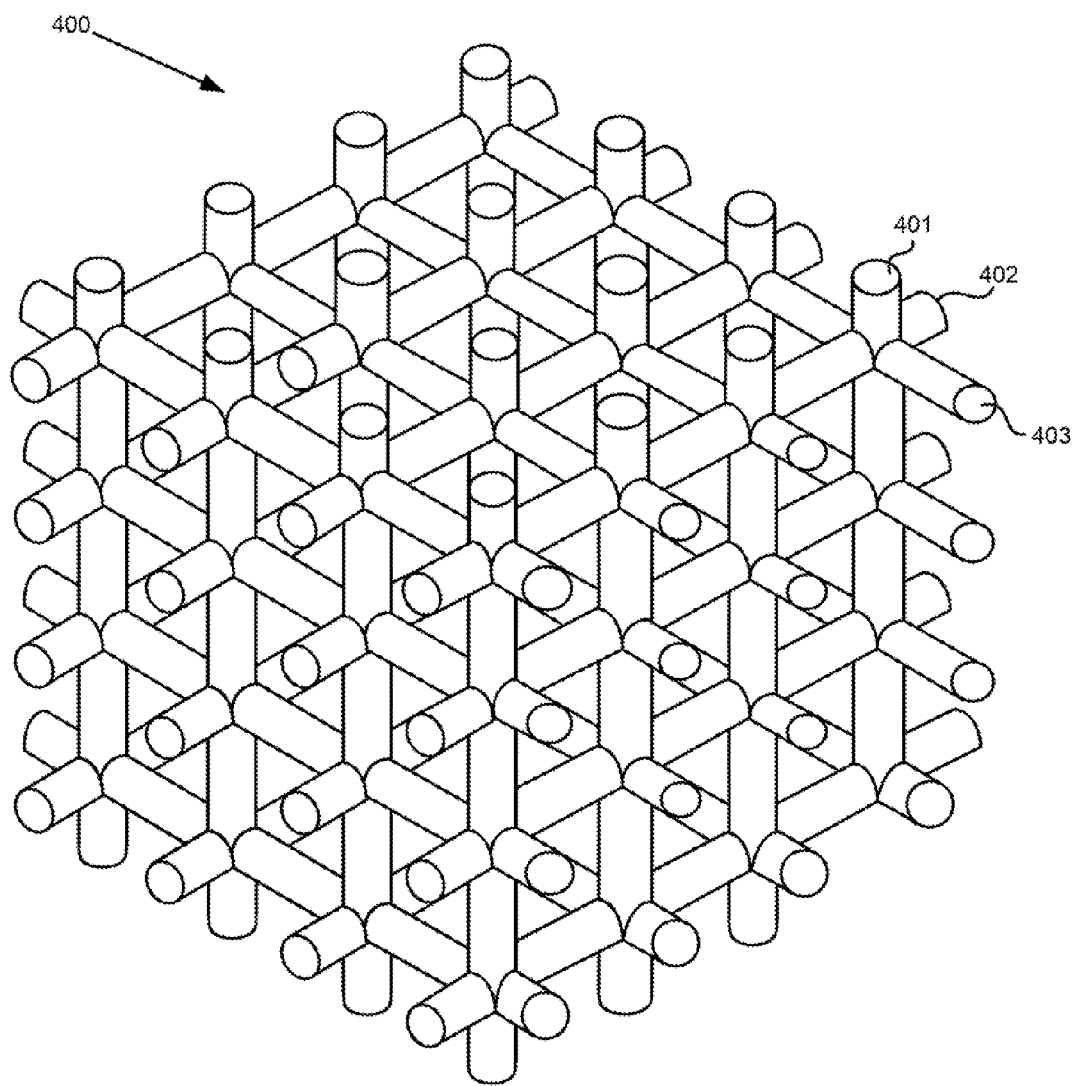
FIG. 4 shows a three dimensional "lattice" structure.

The following description is made for the purpose of illustrating the general principles of the present invention and is not meant to limit the inventive concepts claimed herein. Further, particular features described herein, including any incorporated description, can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As used herein, the term "about" when combined with a value refers to plus and minus 10% of the reference value unless otherwise specified. For example, a temperature of about 50° C. refers to a temperature of 50° C.±5° C., etc.

Various embodiments of the present invention described herein include a high power density fuel cell which may be comprised of less individual parts than conventional fuel cells, and may have other advantageous properties as well. The description herein provides an illustrative and nonlimiting basis for forming the electrodes, electrolyte membrane, and associated anode and cathode flow fields in an integrated platform. Furthermore, the three-dimensional microfluidic flow field architecture of some embodiments, along with porous electrolyte support structures, offers significant advantages to increase the volumetric power density of the fuel cell, as well as allows manufacture of fuel cells via a continuous integration approach.

One general embodiment includes a phosphoric acid fuel cell having an array of microchannels defined by a porous electrolyte support structure extending between bottom and upper support layers, the microchannels including fuel and oxidant microchannels; fuel electrodes formed along some of the microchannels; and oxidant electrodes formed along other of the microchannels. Phosphoric acid or other electrolyte may be added to the porous electrolyte support structure.

Another general embodiment includes a phosphoric acid fuel cell system having an array of microchannels defined by a porous electrolyte support structure, the microchannels including fuel and oxidant microchannels; fuel electrodes formed along some of the microchannels; oxidant electrodes along formed other of the microchannels; a phosphoric acid electrolyte in the porous electrolyte support structure; and a mechanism for causing reactants in immediately adjacent microchannels to flow in opposite directions for inducing counterflow heat exchange.

Another general embodiment includes a method of making a phosphoric acid fuel cell. The method includes etching an array of microchannels in a substrate, thereby forming walls between the microchannels; processing the walls to make the walls porous, thereby forming a porous electrolyte support structure; and forming anode electrodes along some of the walls; forming cathode electrodes along other of the walls. Prior to use, the porous walls may be, filled with a phosphoric acid or other electrolyte.

Yet another general embodiment includes a fuel cell having an array of microchannels defined by a porous electrolyte support structure extending between bottom and upper support layers, the microchannels including fuel and oxidant microchannels; fuel electrodes formed along some of the microchannels; and air electrodes formed along other of the microchannels.

Another general embodiment includes a method of making a fuel cell. The method includes etching an array of microchannels in a substrate, thereby forming walls between the microchannels; processing the walls to make the walls porous, thereby forming a porous electrolyte support structure; forming anode electrodes along some of the walls; forming cathode electrodes along other of the walls; and filling the porous electrolyte support structure with a proton-conducting or ion-conducting electrolyte.

Referring now to FIGS. 1, 2, and 3, one embodiment of a phosphoric acid fuel cell (PAFC) is illustrated. The PAFC is identified generally by the reference numeral 100. The PAFC 100 is produced utilizing different methods of manufacture, particularly MicroElectroMechanical Systems (MEMS) technology. The PAFC 100 includes the following structural components: phosphoric acid reservoir 101, high surface area silicon micropores 102, porous cathode electrode 103, cathode flow fields 104, silicone substrate 105, phosphoric acid electrolyte 106, silicone substrate 107, porous anode electrode 108, high surface area silicon micropores 109, and anode flow fields 110.

Referring now to FIG. 2, an enlarged view of a section of the PAFC 100 is shown. The enlarged section includes electric insulation (oxide) 201, electrolyte, 202, silicon 203, and electrode with catalyst 204. Referring now to FIG. 3, an alternative version of the enlarged view of a section of the PAFC 100 is shown. The alternative version enlarged section includes porous electrode with catalyst 301.

The structural components of the PAFC 100 having been described and illustrated in FIG. 1, FIG. 2, and FIG. 3, the construction and operation of the PAFC 100 will now be described. Included is a discussion of the forming of electrodes 103 and 108, high surface area silicon micropores 103 and 109, and associated anode flow field 110 and cathode flow field 104 in an integrated platform. A 0.5 mm wafer of <100> n+silicon, resistivity approximately 1 milliohm-cm, is anisotropically etched from one side to create a suitable flow field to a depth of up to approximately 425 microns. The other side of the wafer is masked and etched with a high density matrix of pores, up to about several microns across, or possibly up to many tens of microns in diameter, width and aspect ratio of up to about 20, until the pores break through to the other side to the flow field microchannels. The pores are etched by various deep anisotropic etching techniques, including plasma etch, wet chemical etch, laser machining, electrochemical, or photo-electrochemical etching. The phosphoric acid electrolyte 106 is added to the edge of the porous matrix and is wicked in by capillary action to form a membrane-electrode-assembly. This membrane-electrode-assembly (MEA) is then fitted between two flow fields with a sealing gasket around the edge.

The PAFC 100 is ideally suited, both thermally and chemically, for operation in conjunction with a methanol reformer. PAFCs can operate from 150° to 250° C. Above 150° C., the kinetics of carbon monoxide turnover on the fuel cell electrode become favorable, and the presence of one percent carbon monoxide in the fuel stream does not significantly degrade performance. Furthermore, PAFCs do not require humidification of their gas streams for good performance, eliminating the necessity for a tight operating window.

While the tolerance to carbon monoxide renders PAFCs according to several embodiments chemically compatible with reformed hydrocarbon fuels, thermally some embodiments operate best in the 150-200° C. range, in some approaches extending up to 250° C. and higher. Typical hydrocarbon reforming reactions function best in the >250° C. regime; nominally the higher the temperature, the faster the reactions are. As an example, a methanol steam reformer operating at 300-400° C. is very efficient with high reaction rates, but produces a significant amount of carbon monoxide, possibly in excess of several percent. Alternative hydrocarbon fuels include, but are not limited to, ethanol, methane, propane, butane, propanol, dimethyl ether (DME), etc. The conversion process for most of these fuel choices occurs at much higher temperatures (400-700° C.), and produces similar high levels of carbon monoxide on the order of >1 percent, which would be sufficient to poison the anode catalyst of low temperature fuel cells. To further enhance the chemical and thermal integration of a microscale fuel cell with fuel processors, electrolytes operating at higher temperatures compatible with the fuel reforming temperatures may be used in various embodiments. Any such electrolyte may be used in various embodiments of the present invention. Examples of such electrolytes and how they may be employed are disclosed in U.S. patent application Ser. No. 12/829,316 to Morse et al., filed concurrently herewith and having title "High Power Density Fuel Cell and Methods Thereof," which has been incorporated by reference. Proton-conducting or ion-conducting electrolytes of a type known in the art may be used. Examples of suitable electrolytes include solid oxide, diamond, phosphoric acid doped polybenzamidizole, and other composites electrolytes, such as $NH_4PO_3/TiP_2O_7$ for example, or others including $NH_4PO_3/(NH_4)_2TiP_4O_{13}$, and $(NH_4)_2SiP_4O_{13}$.

In some embodiments of the present invention, additional electrolyte options for proton conductive membrane fuel cells (PEMFCs) may incorporate easily processable, about 100% curable, low molecular weight reactive liquid precursors to form solid compositions within the porous support structure. An example is highly fluorinated liquid precursors based on styrenically functionalized reactive perfluoropolyethers (PFPEs) that may be used in conjunction with a fluorinated derivative of sulfonated styrenic (SS) monomers. These fluorinated species can mix to form a single phase condensed liquid that can be fully cured into cross-linked membranes with very high acid levels. In order to successfully synthesize such new materials, it may be necessary to copolymerize fluorinated derivates of the SS monomers with the functional PFPEs as opposed to using the acid form of the styrenic monomer directly: otherwise single phase mixtures may not be achievable.

Other choices of electrolyte to further enhance the chemical and thermal integration of a micro scale fuel cell with fuel processors may be employed. For example, electrolytes operating at higher temperatures compatible with the fuel reforming temperatures are desired. Examples of these that are familiar to experts and non-experts in the field and include solid oxide, diamond, phosphoric acid doped polybenzamidizole, and other composites electrolytes, such as $NH_4PO_3/TiP_2O_7$ for example, or others including $NH_4PO_3/(NH_4)_2TiP_4O_{13}$, and $(NH_4)_2SiP_4O_{13}$.

Some embodiments may further exploit an advanced nanoscale catalyst method compatible with a three dimensional fuel cell architecture. This may include atomic layer deposition techniques, along with solgel/washcoat methods to disperse nanoscale catalyst in the surface region of the nanoporous support matrix, and electrochemical deposition.

Prior art PAFCs are comprised of several parts. At the center is a porous matrix which holds the phosphoric acid electrolyte. This is typically made of a sintered Teflon™/silicon carbide matrix tens of microns thick. The Teflon™/silicon carbide matrix is situated between two pieces of porous carbon fiber sheets, or gas diffusion layers (GDLs), which have had carbon supported platinum electrodes sprayed or screened onto one side. The electrodes and their supporting GDLs also contain a Teflon™ matrix created by the incorporation of Teflon™ particles into the GDLs during fabrication and subsequent sintering. This Teflon™ matrix maintains gas access to the catalyst sites by preventing the electrodes and GDLs from being completely flooded with phosphoric acid. The phosphoric acid electrolyte is added to the edge of the sintered frit and is wicked in by capillary action to form a membrane-electrode-assembly. This membrane-electrode-assembly (MEA) is then fitted between two flow fields with a sealing gasket around the edge. The flow fields are typically machined out of graphite because graphite has good corrosion resistance and electrical conductivity. In many cases flow fields are machined into both sides of a graphite plate, resulting in a bipolar plate. Electrolyte reservoirs may also be machined into the graphite plate. This technique results in about 5 to 7 pieces required per cell: one bipolar plate, one gasket, one electrolyte matrix, two GDL/electrode layers.

The PAFC 100 comprises less individual parts than conventional PAFCs. The PAFC 100 also has other advantageous properties than conventional PAFCs. The other advantageous properties include very high surface area, very thin membranes, and very thin membrane electrode assemblies.

Another approach of producing the PAFC 100 is electrochemical etching techniques that form a porous silicon matrix having random porosity. Examples of this include silica aerogel or solgel structures, anodized alumina, and sintered frits which can be attached to the silicon electrode structure. The electrolyte reservoir 101 is incorporated into this etch procedure as well. The "pore side" of the wafer is processed to give it an oxide or nitride (non-conducting) surface, while the flow field side is sputter coated with platinum or gold or other protective, conductive coating. Two of these wafers, placed with the insulating layers facing inward and with a small amount of phosphoric acid wicked between them and into the pores, will function as a PAFC if the conductive layer applied to them is platinum or other appropriate catalyst. Additionally, the catalyst or electrode layer may be a composite of Carbon with Pt or other catalyst mixed in. A fuel cell "stack," utilizing multiple cells placed back to back, can be made by placing a thin graphite or corrosion resistant metal sheet between opposing flow fields, thereby using the conductive silicon as the electrical conductor in a bipolar stack configuration.

Another approach comprises a method that replaces the "pore side etch" with another high surface area open structure, such as dense arrays of posts, for example, or a three dimensional "lattice" structure. A three dimensional "lattice" structure is shown in FIG. 4. The three dimensional "lattice" structure is generally designated by the reference numeral 400. The three dimensional "lattice" structure 400 includes a lattice element 401 extending in the X axis, a lattice element 402 extending in the Y axis, and a lattice element 403 extending in the Z axis.

Figure 5:
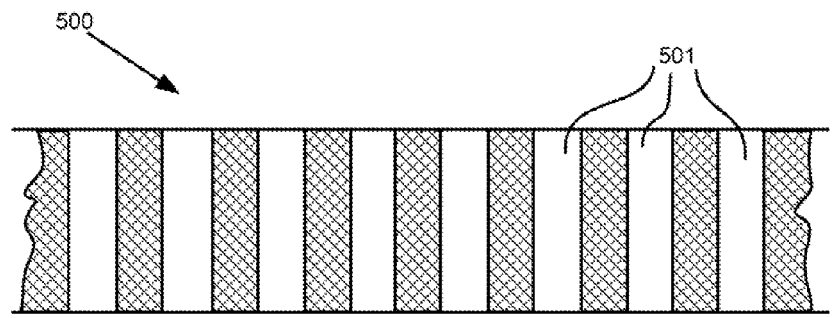
FIG. 5 shows a high aspect ratio micropore structure.

Referring now to in FIG. 5, a high aspect ratio micropore structure is shown. The high aspect ratio micropore structure is generally designated by the reference numeral 500. The high aspect ratio micropore structure 500 includes a micropore 501.

Figure 6:
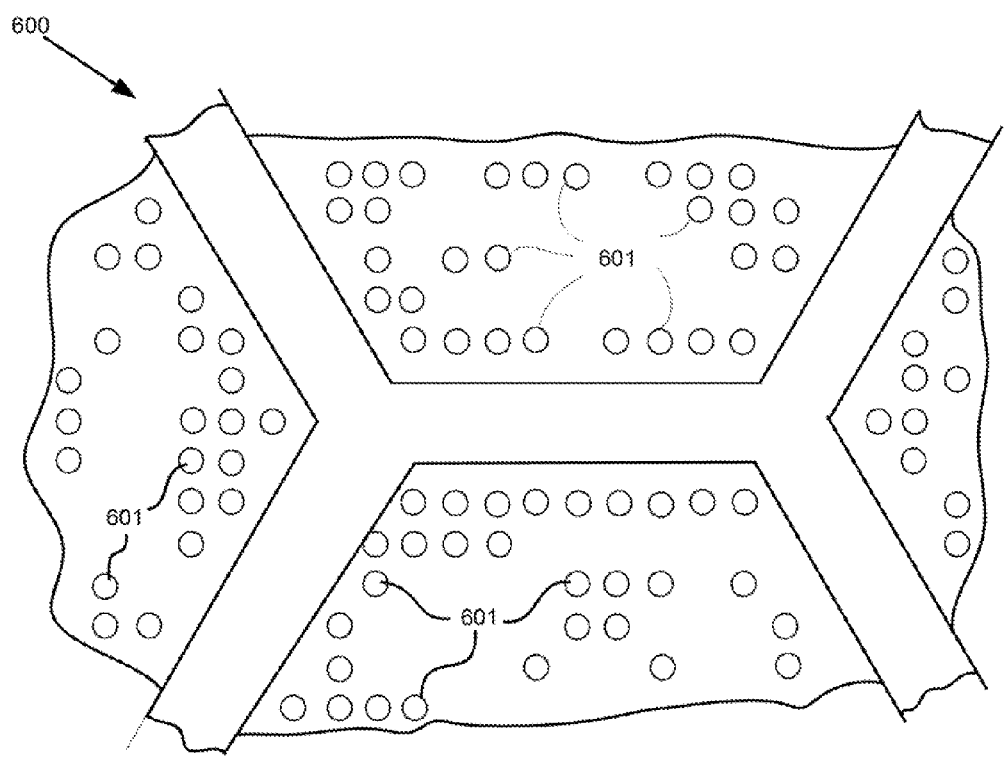
FIG. 6 shows an embodiment that includes arrays of micropores in a microchannel flow field.

Referring now to in FIG. 6, an embodiment of the present invention that includes arrays of micropores in a microchannel flow field is shown. The embodiment that includes arrays of micropores in a microchannel flow field is generally designated by the reference numeral 600. The micropores 601 provide a high surface area structure.

Figure 7:
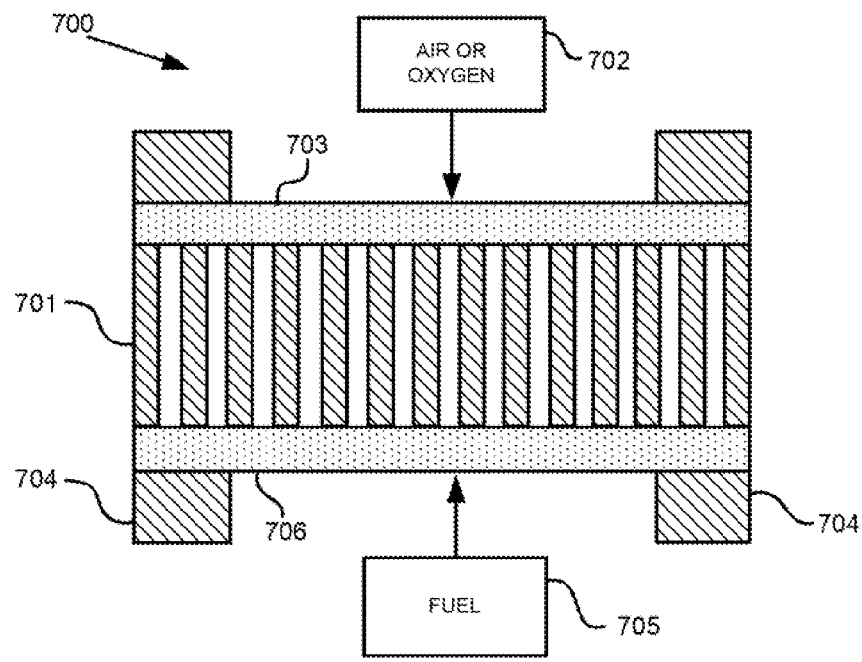
FIG. 7 illustrates another embodiment of a phosphoric acid fuel cell constructed in accordance with one embodiment of the present invention.

Referring now to FIG. 7, another embodiment of a PAFC is illustrated. The PAFC is identified generally by the reference numeral 700. The PAFC 700 includes the following structural components: a porous electrolyte support 701, air or oxidant 702, cathode 703, current carrying bus or manifold 704, fuel 705, and anode 706.

The structural components of the PAFC 700 having been described and illustrated in FIG. 7, the construction and operation of the PAFC 700 will now be described. The PAFC 700 utilizes any electrically insulating porous structure or layer as a structure 701 to hold the phosphoric acid, with electrodes 703 and 706 formed on opposing sides of the porous structure 701. Examples of this material include porous alumina, possibly formed through an anodization process, porous glass, polymers, anodized or insulated metals, porous silicon, aerogels, or other materials used to make frits and filters. The porous structure must wet to phosphoric acid to ensure the phosphoric acid electrolyte is retained in the support structure. This can further be achieved by chemical or coating processes to the porous materials. The porous structure is incorporated in a planar configuration as shown in FIG. 7.

Figure 8:
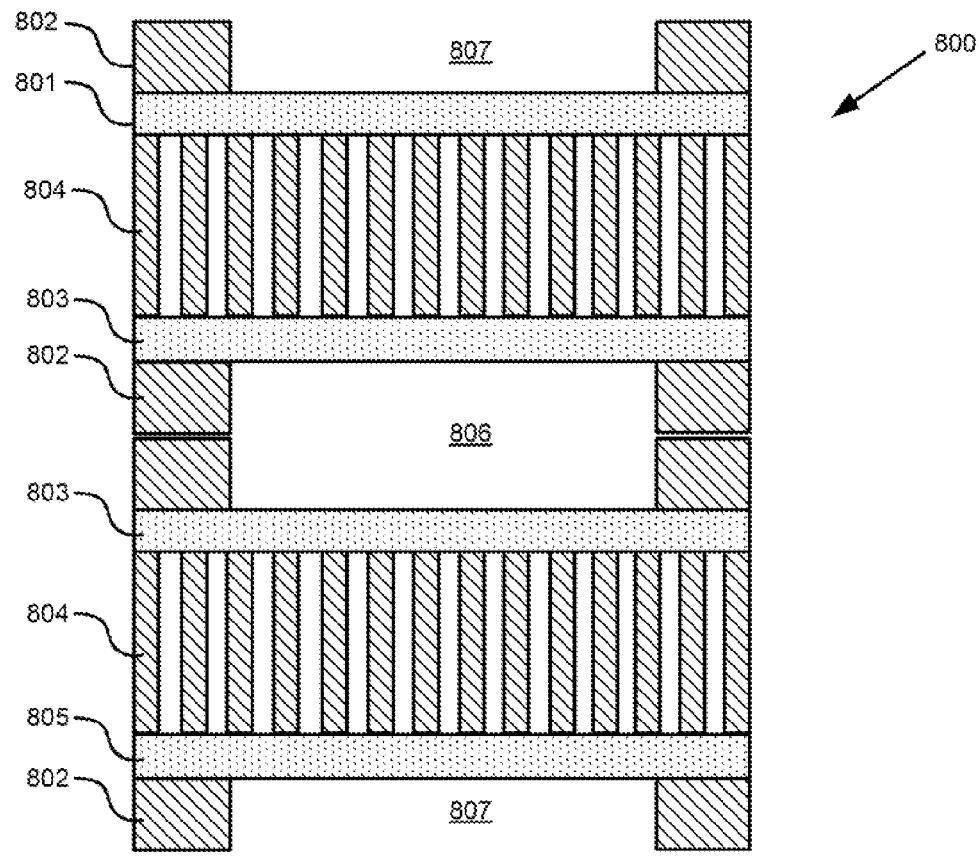
FIG. 8 illustrates another embodiment of a phosphoric acid fuel cell constructed in accordance with one embodiment of the present invention.

Referring now to FIG. 8, another embodiment of a PAFC is illustrated. The PAFC is identified generally by the reference numeral 800. The PAFC 800 includes the following structural components: upper fuel electrode 801, current collector 802, upper and lower air electrodes 803, upper and lower porous electrolyte supports 804, lower fuel electrode 805, air manifold or flow field 806, and fuel manifold or flow field 807. The porous structure is incorporated in a configuration as shown in FIG. 8, wherein current carrying electrodes are applied or a gas manifold can be used to stack the individual membrane electrode assemblies. The insulating electrolyte support layer may further be structured in such a manner as to increase overall surface area of the electrode, including cylindrical, serpentine, or other configurations. This can be accomplished by forming a mold in which a green state frit is placed, then sintered to hold the shape prior to depositing electrodes and electrolyte.

Figure 9:
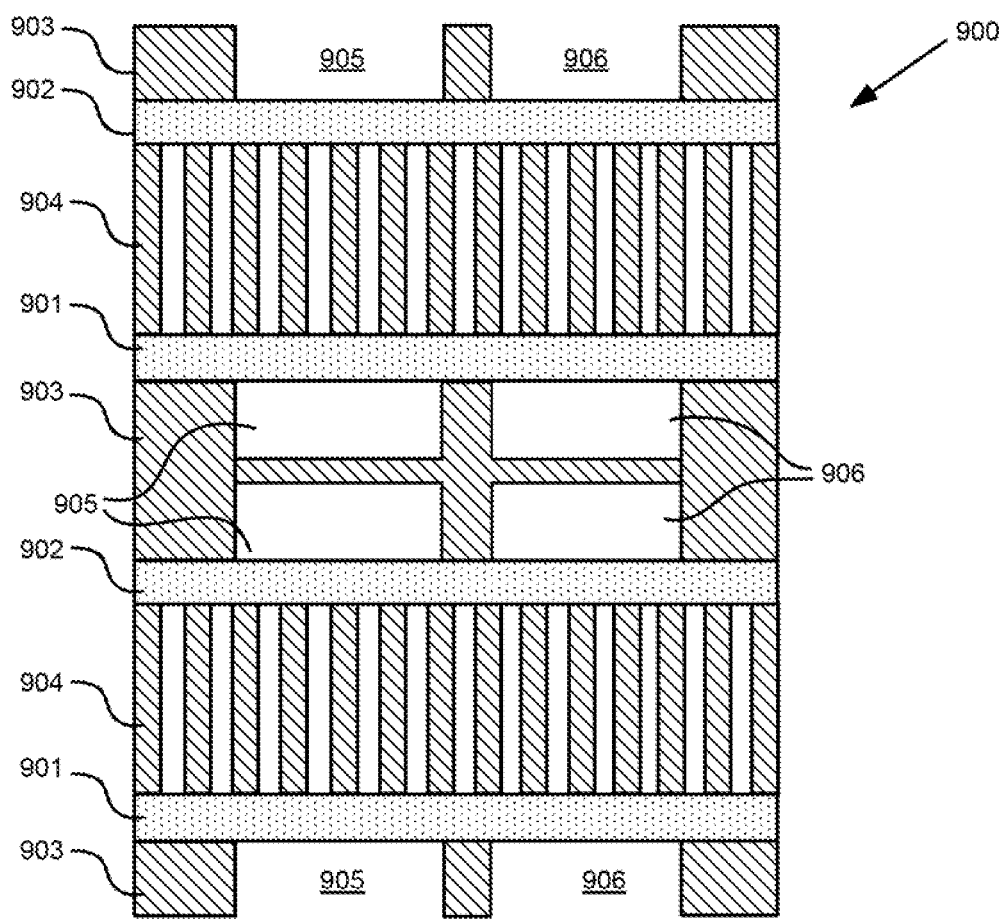
FIG. 9 illustrates a bipolar stack phosphoric acid fuel cell configuration according to one embodiment of the present invention.

Referring now to FIG. 9, another embodiment of a PAFC is illustrated. The PAFC is identified generally by the reference numeral 900. The PAFC 900 is a bipolar stack embodiment. The PAFC 900 includes the following structural components: fuel electrodes 901, air electrodes 902, current collector 903, porous electrolyte support 904, air manifold or flow field 905, and fuel manifold or flow field 906. The porous structure 904 is incorporated in a configuration as shown in FIG. 9, wherein current carrying electrodes are used to stack the individual membrane electrode assemblies. The insulating electrolyte support layer may further be structured in such a manner as to increase overall surface area of the electrode, including cylindrical, serpentine, or other configurations. This can be accomplished by forming a mold in which a green state frit is placed, then sintered to hold the shape prior to depositing electrodes and electrolyte.

Figure 10:
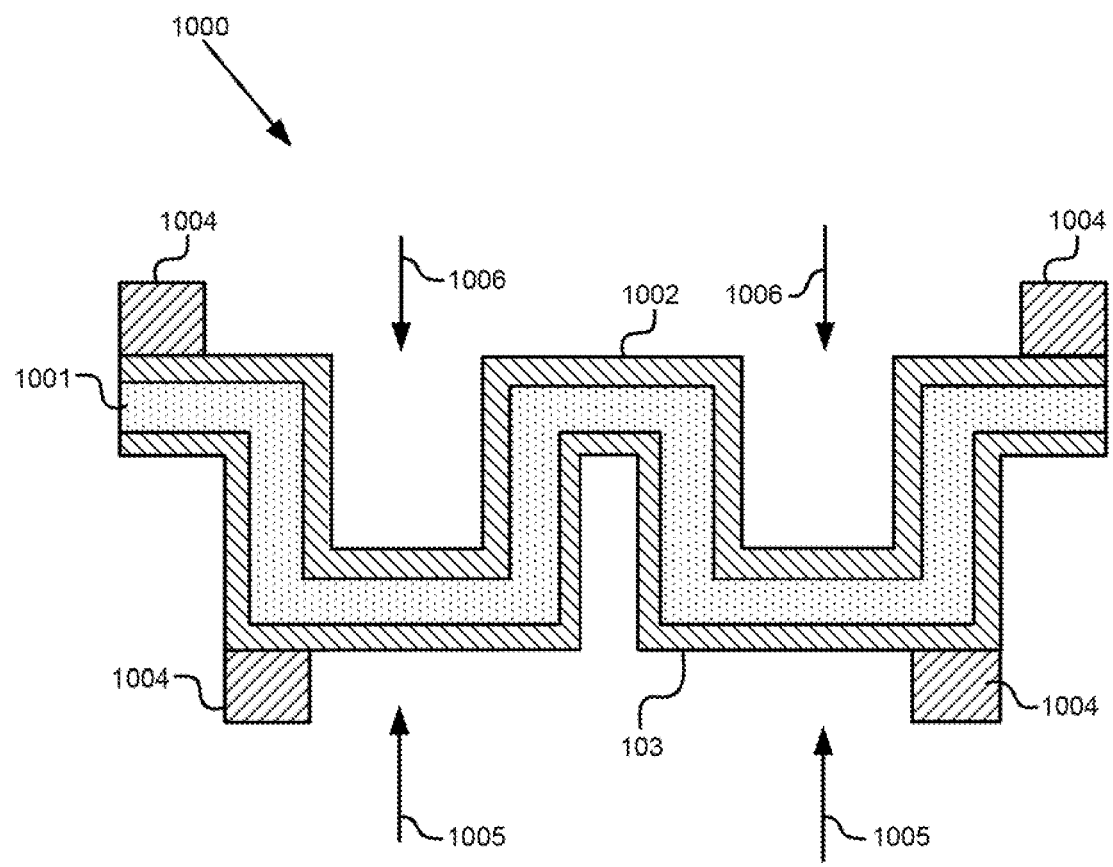
FIG. 10 illustrates a non-planar phosphoric acid fuel cell configuration using a porous ceramic or insulator electrolyte support according to one embodiment of the present invention.

Referring now to FIG. 10, another embodiment of a PAFC is illustrated. The PAFC is identified generally by the reference numeral 1000. The PAFC 1000 includes the following structural components: porous electrolyte support 1001, cathode 1002, anode 1003, current carrying bus or manifold 1004, fuel 1005, and air or oxygen 1006.

The PAFC 1000 is formed in the shape illustrated in silicon or aluminum through approaches such as etching or machining, then making the structure porous to create a continuous layer that holds the shape of the initial structure as shown in FIG. 10. Once the porous support structure is formed, the phosphoric acid electrolyte and electrodes are deposited on opposing sides of the porous support structure. The PAFC 1000 is a non-planar phosphoric acid fuel cell configuration using a porous ceramic or insulator electrolyte support. The membrane can be configured in any shape as long as opposing electrodes and surfaces are isolated by seals to only air or hydrogen flows to the electrode.

In one embodiment very deep channels are formed on opposing surfaces of a substrate. The substrate may be silicon or aluminum, and the channels can be up to several millimeters deep, and as narrow as a few microns. The remaining walls between adjacent microchannels may be 10-100 microns (μm) wide. The walls are then made to be porous by anodic, electrochemical, or other etching techniques. Once the structure has been made completely porous, an electrolyte is deposited into the porous support structure through techniques such as wicking, or flowing the electrolyte through the open microchannels.

Figure 11:
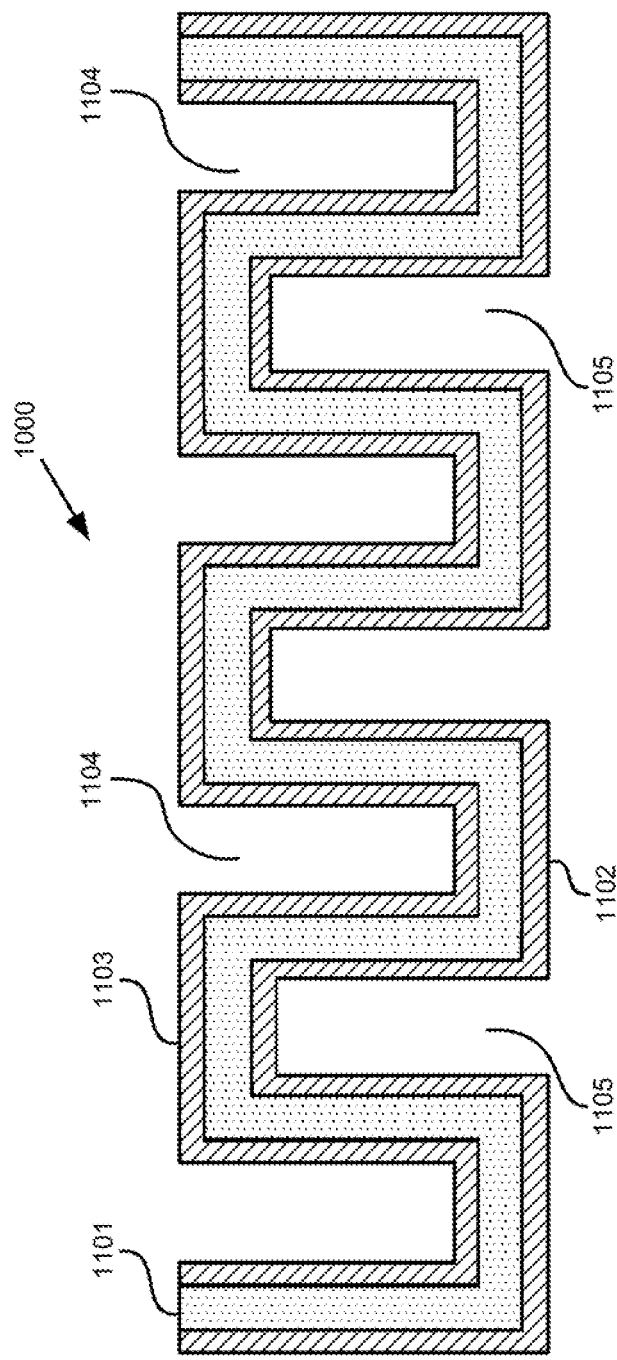
FIG. 11 illustrates another embodiment of a non-planar phosphoric acid fuel cell configuration using a porous ceramic or insulator electrolyte support according to one embodiment of the present invention.

Referring now to FIG. 11, another embodiment of a PAFC is illustrated. The PAFC is identified generally by the reference numeral 1100. The PAFC 1100 includes the following structural components: porous electrolyte support 1101, fuel electrode 1102, air electrode 1103, upper microchannel 1104, and lower microchannel 1005. The PAFC 1100 is a non-planar phosphoric acid fuel cell configuration using porous ceramic or insulator electrolyte support. The membrane can be configured in any shape as long as opposing electrodes and surfaces are isolated by seals to only air or hydrogen flows to the electrode.

The PAFC 1100 is produced utilizing different methods of manufacture, particularly MicroElectroMechanical Systems (MEMS) technology. The porous electrolyte support 1101 may be silicon or aluminum, and the channels 1104 and 1105 can be up to several millimeters deep, and as narrow as a few microns. The remaining walls between adjacent microchannels may be 10-100 μm wide. The walls are then made to be porous by anodic, electrochemical, or other etching techniques. Once the structure has been made completely porous, an electrolyte is deposited into the porous support structure through techniques such as wicking, or flowing the electrolyte through the open microchannels. Air flows along the microchannels 1104 and 1105 for higher effective surface area.

Figure 12:
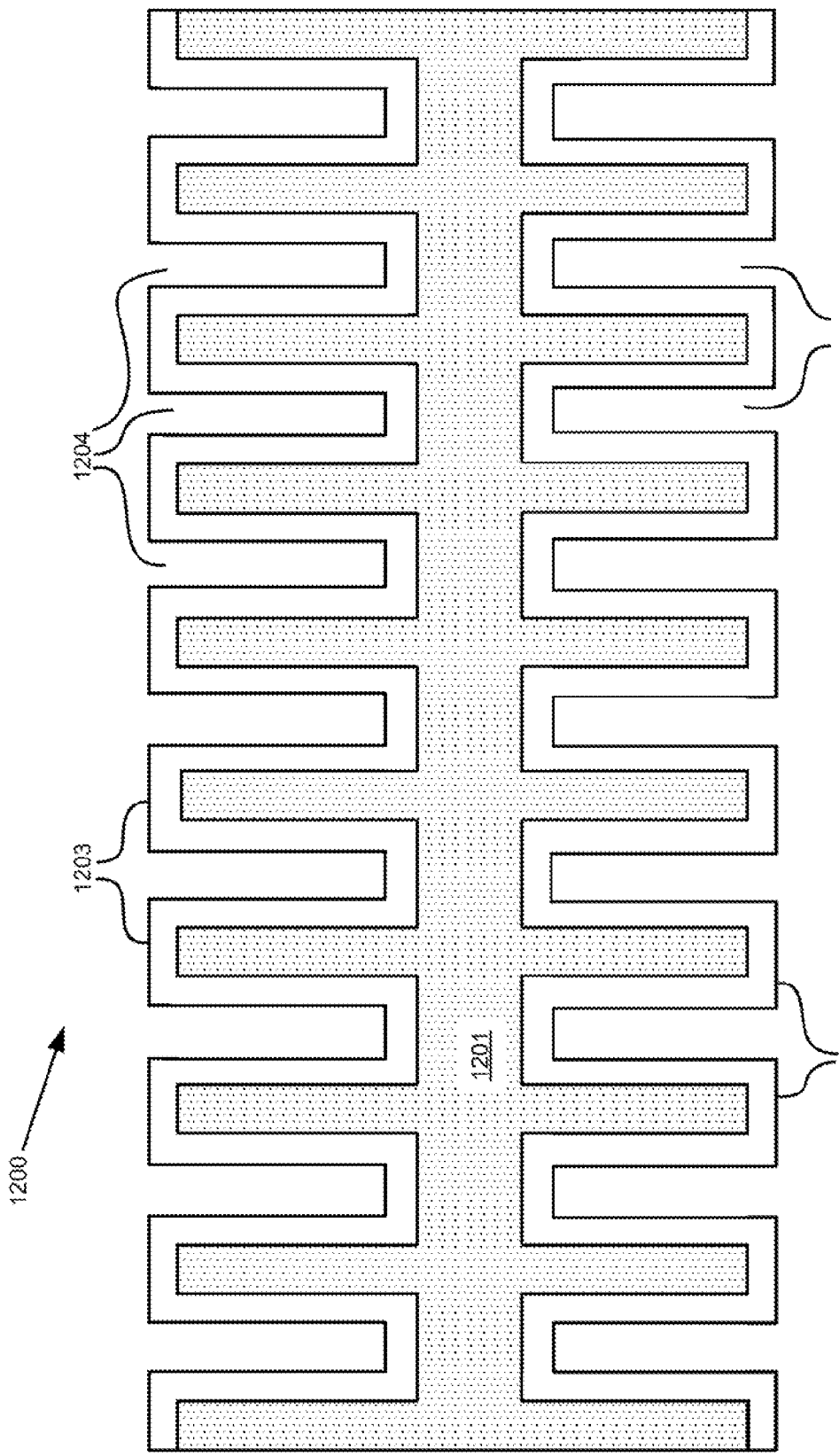
FIG. 12 illustrates another embodiment of a non-planar phosphoric acid fuel cell configuration using a porous ceramic or insulator electrolyte support according to one embodiment of the present invention.

Referring now to FIG. 12, another embodiment of a PAFC is illustrated. The PAFC is identified generally by the reference numeral 1200. The PAFC 1200 includes the following structural components: porous electrolyte support 1201, fuel electrode 1202, air electrode 1203; upper microchannel 1204, and lower microchannel 1005. The PAFC 1200 is a non-planar phosphoric acid fuel cell configuration using porous ceramic or insulator electrolyte support. The membrane can be configured in any shape as long as opposing electrodes and surfaces are isolated by seals to only air or hydrogen flows to the electrode.

The PAFC 1200 may be produced utilizing different methods of manufacture, such as MicroElectroMechanical Systems (MEMS) technology. Electrodes are then deposited on each side of the porous electrolyte membrane 1201, forming a very high electrode surface as shown in FIG. 12. The porous electrolyte support 1201 may be silicon or aluminum, and the channels 1204 and 1205 can be up to several millimeters deep, and as narrow as a few microns. The remaining walls between adjacent microchannels may be 10-100 μm wide. The walls are then made to be porous by anodic, electrochemical, or other etching techniques. Once the structure has been made completely porous, an electrolyte is deposited into the porous support structure through techniques such as wicking, or flowing the electrolyte through the open microchannels, which then absorbs or wicks into the porous ridge structure. Air and fuel flows along the microchannels 1204 and 1205, respectively, for higher effective surface area.

Figure 13:
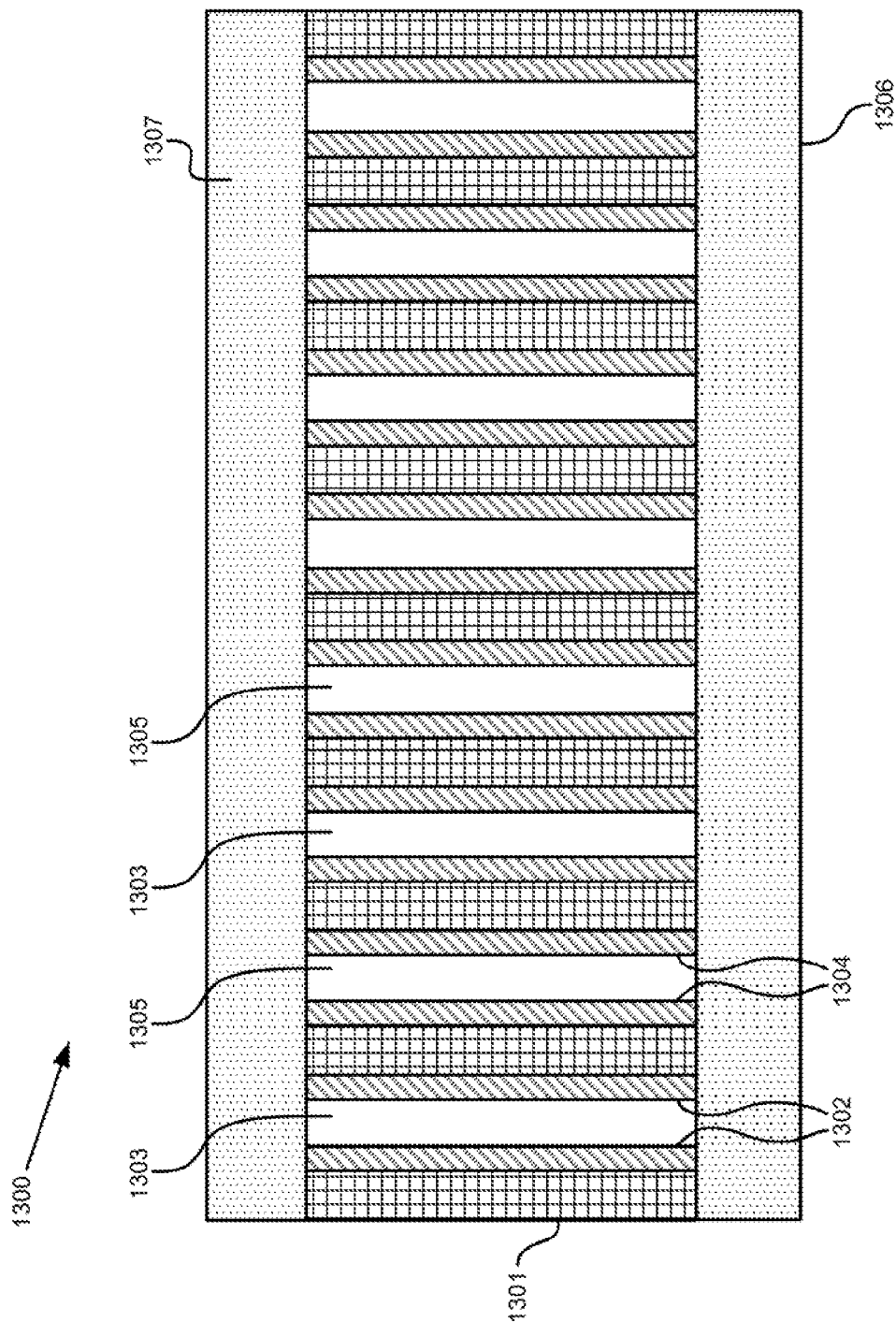
FIG. 13 illustrates another embodiment of a phosphoric acid fuel cell constructed in accordance with one embodiment of the present invention.

Referring now to FIG. 13, another embodiment of a PAFC is illustrated. The PAFC is identified generally by the reference numeral 1300. The PAFC 1300 includes the following structural components: porous electrolyte support structure 1301 (also referred to as a porous support structure and porous walls); fuel electrodes 1302; fuel microchannels 1303 containing or for receiving fuel; oxidant electrodes 1304 (also referred to herein as air electrodes); oxidant microchannels 1305 (also referred to herein as air microchannels) containing or for receiving an oxidant such as air, oxygen and/or an oxygen-containing gas or liquid; bottom support 1306; and upper support 1307. The fuel microchannels 1303 for fuel and the oxidant microchannels 1305 for oxidant are positioned between the bottom support 1306 and the upper support 1307, preferably in alternating fashion. The PAFC 1300 may be produced utilizing various methods of manufacture, including but not limited to MicroElectroMechanical Systems (MEMS) technology, semiconductor fabrication technology, etc. and combinations thereof.

The PAFC 1300 in one embodiment may be implemented as a microchannel phosphoric acid fuel cell having a microchannel array etched in a substrate, e.g., comprising silicon, a metal such as aluminum, glass, polymer, ceramic, plastic, epoxy resin, a metal oxide materials such as alumina, etc. preferably with the provision of being nonelectrically conductive, as well as stable for the specific electrolyte material from a chemical, thermal, and surface wetting standpoint. etc. The microchannels may have depths from less than one millimeter up to several millimeters and widths ranging from about 10-1000 μM, or more or less. The remaining walls may be about 1-500 μm wide, or more or less, preferably about 5-50 μm. The microchannels may be elongated and have longitudinal axes that are substantially parallel, where each wall separating adjacent microchannels separates an oxidant microchannel and a fuel microchannel.

Once the channels are etched, the walls are made porous in one approach by an anodizing or electrochemical etch, chemical and/or ion exchange, or other techniques used to make materials porous. As an option, the surfaces of the pores can be functionalized by known chemical processes in order to selectively wet the electrolyte. In another approach, electrically controlled surface wetting may be employed to help the electrolyte to wick into the pore structures.

The bottom support layer 1306 and the upper support layer 1307 may be porous, but are preferably primarily non-porous. The sidewalls are coated with electrodes. The electrode is not continuous over the top surface. This may be accomplished by using photolithographic techniques or a "lift off" approach. As an option, reforming catalysts such as platinum, carbon, copper, zinc, alumina, or other catalysts sufficient to convert the specific hydrocarbon fuel to be used with the PAFC to a hydrogen rich feed may be provided, e.g., coated, inside the micro flow channel leading to the fuel cell anode, and may or may not form part of, or be integrated with, the electrode. The porous walls of the porous support structure are filled with a phosphoric acid electrolyte. A non-porous cap layer (e.g., the upper support layer 1307) is bonded to the top surface to form a continuous, sealed microchannel array. If oxidant and fuel flow in adjacent and alternating microchannels, each separating wall represents a fuel cell, with the entire array representing a fuel cell stack. Electrical connections to alternating electrodes can be made at the ends of the channels, and bussed accordingly for optimal power output.

The effective catalyst/electrode surface area can be substantially increased by (1) the addition of a platinum (or other metallic) nanoparticle supported on carbon black powder and/or (2) the introduction of carbon nanostructures such as nanotubes, nanorods, nanoparticles, etc. into and around the pores on the flow field/conductive side of the wafer prior to charging with phosphoric acid. In addition to carbon black powder, platinum on other conductive supports of high surface area to volume ratio also function well in this regard. Other high surface area, porous electrode materials and compositions may be used, including the range of materials known to those familiar in the art. A Teflon™-containing emulsion can be added to the carbon/catalyst mixture and sintered to limit the intrusion of phosphoric acid into the catalyst layer. The Teflon™-containing emulsion is also expected to create a more favorable electrolyte/gas interface at the catalyst sites. The use of hydrophobic/hydrophilic mixtures of carbon particles may also provide a similar, useful partition of the gas and electrolyte domains, leading to improved performance.

It is to be noted that, with the exception of the optional Teflon™ treatment mentioned above, some configurations of the fuel cells described herein contain no polymeric materials, and thus would be extremely radiation resistant. While other fuel cell types, such as molten carbonate or solid oxide fuel cells also contain no polymeric materials, they are rarely capable of operating at temperature ranges below 500° C. Thus, one of the advantages of some of the PAFC embodiments disclosed herein is that they are capable of operation in high radiation environments at convenient operating temperatures for methanol reforming. The operating temperature is not a prohibitively high temperature where thermal management and heat loss becomes detrimental for small (<100 W) fuel cell configurations.

A further advantage provided by some embodiments is the high surface areas of the channel sidewalls that form the membrane between reactant flow paths offers a mechanism for counterflow heat exchange to maintain a cool temperature for the membrane sidewall and fuel cell structure. In this manner cool reactant gases flowing into opposite ends of the channel extract heat from the channel sidewall, which is the fuel cell membrane, thereby enabling cooling of the structure. Fans, pressure devices, etc. may be used as the mechanism for causing the reactants in immediately adjacent microchannels to flow in opposite directions for inducing the counterflow heat exchange.

In use, the fuel cells may be used as portable or fixed power sources for any desired application. Illustrative uses include mobile power sources for military operations, automotive applications, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A phosphoric acid fuel cell, comprising:
   an array of microchannels defined by a porous electrolyte support structure extending between bottom and upper support layers, the microchannels including fuel and oxidant microchannels;
   fuel electrodes formed along some of the microchannels; and
   air electrodes formed along other of the microchannels.

2. The phosphoric acid fuel cell as recited in claim 1, further comprising a reforming catalyst inside the microchannels having the fuel electrodes.

3. The phosphoric acid fuel cell as recited in claim 2, wherein the reforming catalyst is selected from a group consisting of platinum, carbon, copper, zinc, and alumina.

4. The phosphoric acid fuel cell as recited in claim 1, wherein the porous electrolyte support structure comprise a material selected from a group consisting of silicon, a metal, glass, polymer, ceramic, plastic, epoxy resin, and a metal oxide.

5. The phosphoric acid fuel cell as recited in claim 1, further comprising phosphoric acid electrolyte in the porous electrolyte support structure.

6. The phosphoric acid fuel cell as recited in claim 1, wherein the microchannels are elongated and have longitudinal axes that are substantially parallel, wherein alternating microchannels have fuel and oxidant electrodes therein.

7. The phosphoric acid fuel cell as recited in claim 1, further comprising metallic nanoparticles in the porous electrolyte support structure.

8. The phosphoric acid fuel cell as recited in claim 7, wherein the nanoparticles comprise platinum.

9. The phosphoric acid fuel cell as recited in claim 1, further comprising carbon nanostructures in pores of the porous electrolyte support structure.

10. The phosphoric acid fuel cell as recited in claim 1, with the proviso that the cell contains no polymeric material.

11. The phosphoric acid fuel cell as recited in claim 1, further comprising a phosphoric acid electrolyte in the porous electrolyte support structure; and a mechanism for causing reactants in immediately adjacent microchannels to flow in opposite directions for inducing counterflow heat exchange.

12. A fuel cell, comprising:
    an array of microchannels defined by a porous electrolyte support structure extending between bottom and upper support layers, the microchannels including fuel and oxidant microchannels;
    fuel electrodes formed along some of the microchannels; and
    air electrodes formed along other of the microchannels.

13. The fuel cell as recited in claim 12, further comprising a reforming catalyst inside the microchannels having the fuel electrodes.

14. The fuel cell as recited in claim 12, wherein the porous electrolyte support structure comprise a material selected from a group consisting of silicon, a metal, glass, polymer, ceramic, plastic, epoxy resin, and a metal oxide.

15. The fuel cell as recited in claim 12, further comprising a proton-conducting or ion-conducting electrolyte in the porous electrolyte support structure.

16. The fuel cell as recited in claim 12, wherein the microchannels are elongated and have longitudinal axes that are substantially parallel, wherein alternating microchannels have fuel and oxidant electrodes therein.

17. The fuel cell as recited in claim 12, further comprising metallic nanoparticles in the porous electrolyte support structure.

18. The fuel cell as recited in claim 12, further comprising carbon nanostructures in pores of the porous electrolyte support structure.

19. The fuel cell as recited in claim 12, with the proviso that the cell contains no polymeric material.

20. The phosphoric acid fuel cell as recited in claim 1, wherein one or more pores of the porous electrolyte support structure exhibit physical characteristics of being formed by a process selected from the group consisting of: anodic etching, electrochemical etching, chemical exchange and ion exchange.

21. The phosphoric acid fuel cell as recited in claim 1, wherein the porous electrolyte support structure comprises a plurality of porous walls defining the array of microchannels, and
    wherein each porous wall is adapted to store a fluidic electrolyte in a plurality of pores thereof.

22. The phosphoric acid fuel cell as recited in claim 21, wherein each non-terminal porous wall is sandwiched between one of the fuel electrodes and one of the air electrodes.

23. The phosphoric acid fuel cell as recited in claim 1, wherein the porous electrolyte support structure is adapted to wick an electrolyte into a plurality of pores of the porous electrolyte support structure.

24. The phosphoric acid fuel cell as recited in claim 1, wherein the porous electrolyte support structure is functionalized to selectively wick an electrolyte of a first characteristic into a plurality of pores of the porous electrolyte support structure.

25. The phosphoric acid fuel cell as recited in claim 1, wherein pores of the porous electrolyte support structure provide the electrodes access to an electrolyte.

26. The phosphoric acid fuel cell as recited in claim 1, wherein the bottom and upper support layers are each non-porous, and
wherein the array of microchannels is a continuous, sealed array.

27. The phosphoric acid fuel cell as recited in claim 1, wherein the porous electrolyte support structure is characterized as a three-dimensional lattice.

28. The phosphoric acid fuel cell as recited in claim 27, wherein pores of the porous electrolyte support structure provide the electrodes access to an electrolyte.

29. The fuel cell as recited in claim 12, wherein one or more pores of the porous electrolyte support structure exhibit physical characteristics of being formed by a process selected from the group consisting of: anodic etching, electrochemical etching, chemical exchange and ion exchange.

30. The fuel cell as recited in claim 12, wherein the porous electrolyte support structure comprises a plurality of porous walls defining the array of microchannels, and
wherein each porous wall is adapted to store a fluidic electrolyte in a plurality of pores thereof.

31. The fuel cell as recited in claim 30, wherein each non-terminal porous wall is sandwiched between one of the fuel electrodes and one of the air electrodes.

32. The fuel cell as recited in claim 12, wherein the porous electrolyte support structure is adapted to wick an electrolyte into a plurality of pores of the porous electrolyte support structure.

33. The fuel cell as recited in claim 12, wherein the porous electrolyte support structure is functionalized to selectively wick an electrolyte of a first characteristic into a plurality of pores of the porous electrolyte support structure.

34. The fuel cell as recited in claim 12, wherein pores of the porous electrolyte support structure provides access for an electrolyte to the electrodes.

35. The fuel cell as recited in claim 12, wherein the bottom and upper support layers are each non-porous, and
wherein the array of microchannels is a continuous, sealed array.

36. The fuel cell as recited in claim 12, wherein the porous electrolyte support structure is characterized as a three-dimensional lattice.

37. The fuel cell as recited in claim 36, wherein pores of the porous electrolyte support structure provide the electrodes access to an electrolyte.

38. A fuel cell, comprising:
an upper support layer;
a bottom support layer;
a porous electrolyte support structure comprising a plurality of porous walls extending between the bottom and upper support layers;
an array of microchannels defined by the porous electrolyte support structure;
a plurality of fuel electrodes formed along some of the microchannels;
a plurality of air electrodes formed along other of the microchannels;
a mechanism for causing reactants in immediately adjacent microchannels to flow in opposite directions for inducing counterflow heat exchange,
wherein the microchannels comprise fuel and oxidant microchannels, and
wherein the pores of the porous electrolyte support structure are configured to provide the electrodes access to a fluidic electrolyte.

39. The fuel cell as recited in claim 30, further comprising:
a phosphoric acid electrolyte in a plurality of pores of the porous electrolyte support structure; and
a mechanism for causing reactants in immediately adjacent microchannels to flow in opposite directions for inducing counterflow heat exchange,
wherein one or more pores of the porous electrolyte support structure exhibit physical characteristics of being formed by a process selected from the group consisting of: anodic etching, electrochemical etching, chemical exchange and ion exchange,
wherein each non-terminal porous wall is sandwiched between one of the fuel electrodes and one of the air electrodes,
wherein the porous electrolyte support structure is functionalized to selectively wick an electrolyte of a first characteristic into a plurality of pores of the porous electrolyte support structure,
wherein the bottom and upper support layers are each non-porous,
wherein the array of microchannels is a continuous, sealed array,
wherein the porous electrolyte support structure is characterized as a three-dimensional lattice,
wherein pores of the porous electrolyte support structure provide the electrodes access to an electrolyte, and
wherein the pores of the porous electrolyte support structure provide the electrodes access to the phosphoric acid electrolyte.

* * * * *